(12) United States Patent
Li et al.

(10) Patent No.: US 8,483,323 B2
(45) Date of Patent: Jul. 9, 2013

(54) METHODS AND APPARATUSES FOR CHANNEL ESTIMATION OF OFDM SYSTEMS TO COMBAT MULTIPATH FADING

(75) Inventors: Guogang Li, Shanghai (CN); Xiangyang Gong, Shanghai (CN); Cindy C. Wang, Shanghai (CN)

(73) Assignee: Amlogic Co., Ltd., Santa Clara, CA (US)

( * ) Notice: Subject to any disclaimer, the term of this patent is extended or adjusted under 35 U.S.C. 154(b) by 955 days.

(21) Appl. No.: 12/558,326

(22) Filed: Sep. 11, 2009

(65) Prior Publication Data

US 2011/0064163 A1    Mar. 17, 2011

(51) Int. Cl.
*H04L 27/06* (2006.01)
*H03K 9/00* (2006.01)

(52) U.S. Cl.
USPC .......................................... 375/340; 375/316

(58) Field of Classification Search
USPC .................................................. 375/316, 340
See application file for complete search history.

(56) References Cited

U.S. PATENT DOCUMENTS

| | | | |
|---|---|---|---|
| 2004/0161022 A1* | 8/2004 | Glazko et al. | 375/152 |
| 2005/0111538 A1* | 5/2005 | Wernaers | 375/229 |
| 2006/0013325 A1* | 1/2006 | Agrawal et al. | 375/260 |
| 2009/0180558 A1* | 7/2009 | Ma et al. | 375/260 |

* cited by examiner

*Primary Examiner* — Chieh M Fan
*Assistant Examiner* — Brian J Stevens
(74) *Attorney, Agent, or Firm* — Venture Pacific Law, PC

(57) ABSTRACT

Methods for channel estimation for OFDM schemes are provided to combat multipath fading. Scattered pilot symbols are adaptively tracked by applying a weighted summation function over the received symbols to get a "snapshot" of the pilot symbols. Channel impulse response and frequency response can then be applied to the snapshot for channel estimation. The channel estimation is then used for interpolating one or more data symbols. Furthermore, the path information of the channel impulse response can help to optimize the OFDM window position.

15 Claims, 6 Drawing Sheets

METHODS AND APPARATUSES FOR CHANNEL ESTIMATION OF OFDM SYSTEMS TO COMBAT MULTIPATH FADING

FIELD OF THE INVENTION

This invention relates to methods for channel estimation of orthogonal frequency divisional multiplexing ("OFDM") modulation systems, and, in particular, to methods for decoding received symbols based on channel estimation using the scattered pilots of subcarriers.

BACKGROUND

Orthogonal frequency division multiplexing is a multi-carrier transmission technique that uses orthogonal subcarriers to transmit information within an available spectrum. Since the subcarriers are orthogonal to one another, they may be spaced much more closely together within the available spectrum than, for example, the individual channels in a conventional frequency division multiplexing ("FDM") system.

In an OFDM system, the subcarriers may be modulated with a low-rate data stream before transmission. It is advantageous to transmit a number of low-rate data streams in parallel instead of a single high-rate stream since low symbol rate schemes suffer less from intersymbol interference ("ISI") caused by multipath fading. For this reason, many modern digital communications systems are turning to the OFDM as a modulation scheme for signals that need to survive in environments having multipath or strong interference. Many transmission standards have already adopted the OFDM system, including the IEEE 802.11a standard, the Digital Video Broadcasting Terrestrial ("DVB-T"), the Digital Audio Broadcast ("DAB"), and the Digital Television Broadcast ("T-DMB").

At the transmitter side for OFDM signals, the data is encoded, interleaved, and modulated to form data symbols. Overhead information is added, such as pilot symbols. The symbols (data plus overhead) are organized into OFDM symbols. Each symbol is allocated to represent a component of a different orthogonal frequency. An inverse fast Fourier transform ("IFFT") is applied to the OFDM symbol to generate time samples of a signal. Cyclic extensions are then added to the signal and passed through a digital-to-analog converter. Finally, the transmitter transmits the signal to a receiver along a channel.

When the receiver receives the signal, the inverse operations are performed. The received signal is passed through an analog-to-digital converter, and timing information is then determined. The cyclic extensions are removed from the signal. The receiver performs a FFT on the received signal to recover the frequency components of the signal, that is, the data symbols. Error correction may be applied to the data symbols to compensate for variations in phase and amplitude caused during the propagation of the signal along the channel. The data symbols are then demodulated, de-interleaved, and decoded, to yield the transmitted data.

The variations in phase and amplitude resulting from propagation along the channel are referred to as the channel response. The channel response is usually frequency and time dependent. If the receiver can determine the channel response, the received signal can be corrected to compensate for the channel degradation. The determination of the channel response is called channel estimation. The inclusion of pilot symbols in each OFDM symbol and/or in each subcarrier allows the receiver to carry out channel estimation. The pilot symbols are transmitted with a value known to the receiver. When the receiver receives the OFDM symbol, the receiver compares the received value of the pilot symbols with the known transmitted value of the pilot symbols to estimate the channel response.

The pilot symbols are overhead, and should be as few in number as possible in order to maximize the transmission rate of data symbols. Since the channel response can vary with time and with frequency, the pilot symbols are scattered amongst the data symbols to provide as complete a range as possible of channel response over time and frequency. The set of frequencies and times at which pilot symbols are inserted is referred to as a pilot pattern. FIG. 1 illustrates a pilot distribution pattern of the DVB-T system. Referring to FIG. 1, the pilot symbols are scattered amongst the data carrier symbols along the time domain (y-axis) and the frequency domain (x-axis) forming a grid to enable two-dimensional interpolation. The solid black circles represent the pilot symbols, and the empty circles represent the data carrier symbols. The variable K represents the number of subcarriers in the frequency domain. As an example, for DVB-T systems, in the 2K mode, there are a total of 1705 subcarriers; and in the 8K mode there are a total of 6817 subcarriers.

FIG. 2 illustrates the conventional approach for channel estimation through interpolation in the time domain (y-axis) and in the frequency domain (x-axis). Referring to FIG. 2, the conventional methods for channel estimation involve using a 2-D Weiner filter or other 2-D filters to interpolate a current data carrier by using known data carriers, also known as pilot symbols, surrounding that current data carrier.

In order to estimate the channel response for a current data carrier, future and past frames must be stored for this symbol up to a certain number of symbols, where that number depends on the amount of Doppler shift and the amount of acceptable error in the channel estimation. Referring to FIG. 2, symbol 210 is the current symbol that is being interpolated. In order to interpolate this data carrier, symbol 210, generally 12 scattered pilot symbols must be stored. These 12 scattered pilot symbols are illustrated by the lines connecting symbol 210 and the respective pilot symbols.

For the 8K mode in the DVB-T, 2730 bytes are needed to be stored for one scattered pilot symbol. Therefore, using 12 scattered pilot symbols for channel estimation requires 32.769 Kb of memory. Fewer than 12 pilot symbols may be used for channel estimation, but this comes at the cost of performance degradation. However, the minimum number of pilot symbols needed for interpolation is three. Thus in terms of memory requirements, 8190 bytes for the 8k mode and 2048 bytes in the 2K mode are needed to store three pilot symbols.

Therefore, it is desirable to provide methods for channel estimation where the amount of memory used for channel estimation can be reduced.

SUMMARY OF INVENTION

An object of this invention is to provide methods for reducing the memory needed for channel estimation of OFDM subcarriers without drastic degradation in performance.

Another object of this invention is to provide methods that can dynamically track the variations of multipath fading by estimating a CIR for every symbol.

Briefly, the present invention relates methods for decoding received symbols, comprising the steps of: generating a scattered pilot snapshot based on received symbols; calculating a channel impulse response ("CIR") using the scattered pilot snapshot; calculating a channel frequency response based on the channel impulse response; and decoding a received symbol based on the channel frequency response.

An advantage of this invention is that the memory needed for channel estimation of OFDM subcarriers is reduced without drastic degradation in performance.

Another advantage of this invention is that the variations of multipath fading can be dynamically tracked by estimating a CIR for every symbol.

DESCRIPTION OF THE DRAWINGS

The foregoing and other objects, aspects, and advantages of the invention will be better understood from the following detailed description of the preferred embodiment of the invention when taken in conjunction with the accompanying drawings in which.

DETAILED DESCRIPTION OF THE PREFERRED EMBODIMENTS

Figure 3:
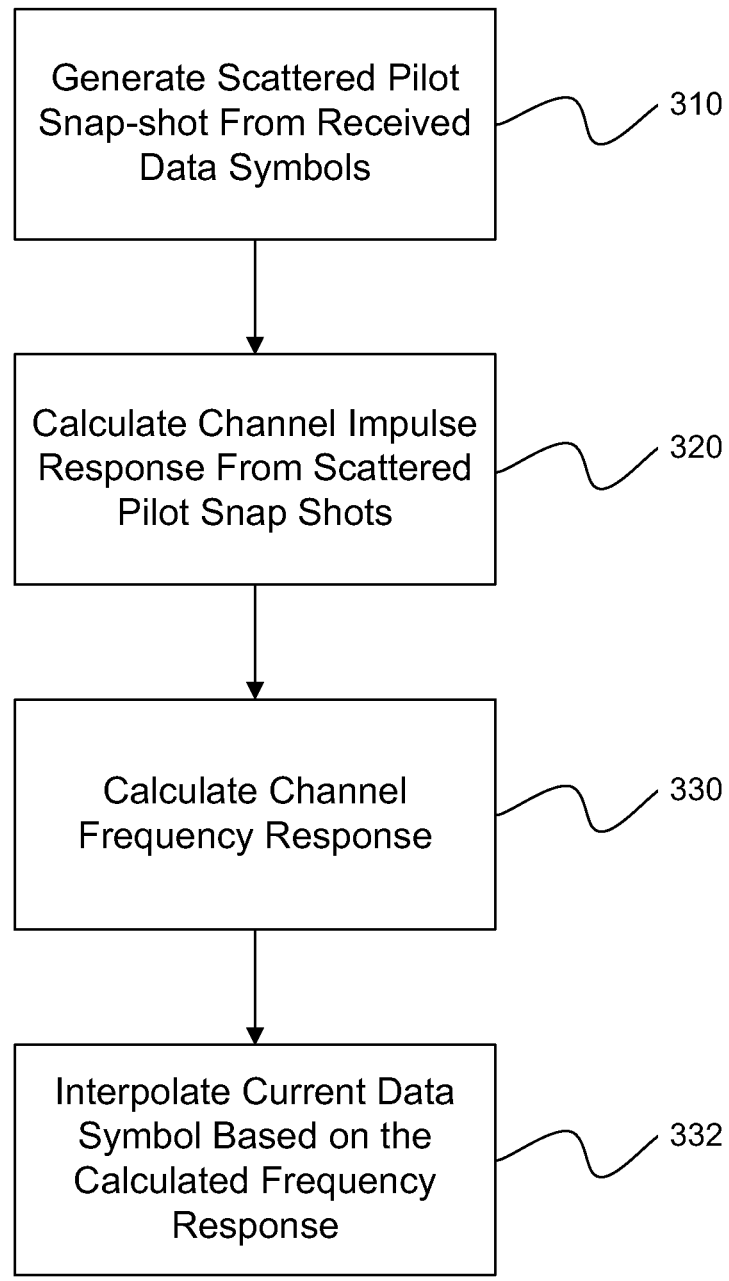
FIG. 3 illustrates a process flow of an embodiment of the present invention for estimating the channel response and frequency response by using a scattered pilot snapshot.

FIG. 3 illustrates a process flow for estimating the channel response and frequency response by using a weighted summation of the received OFDM symbols, herein referred to as a "scattered pilot snapshot" or "snapshot." Referring to FIG. 3, the channel response is monitored through multipath management for each received symbol. During this multipath management for each received symbol, a scattered pilot snapshot is generated 310. Next, a channel impulse response can be calculated 320 using that snapshot. The frequency response estimation 330 can then be performed to get the channel response. With the channel response information, the receiver can then be adjusted to interpolate the current data carrier symbol 332. This process can be repeated for each successive data carrier symbol that is received.

Scattered Pilot Snapshot

The scattered pilot snapshot is generated by applying a weighted summation function on the received OFDM symbols. A weight set can be a set of low pass filter coefficients, which can be used to reject high frequency changes from one OFDM symbol to another symbol per carrier. For each symbol, a weight is assigned and summed with previously received symbols for a subcarrier. Thereby, only one weighted pilot may be needed to be stored for interpolation of a data carrier symbol, whereas in prior art methods at least three or more pilot symbols are stored for use in interpolation.

Figure 4:
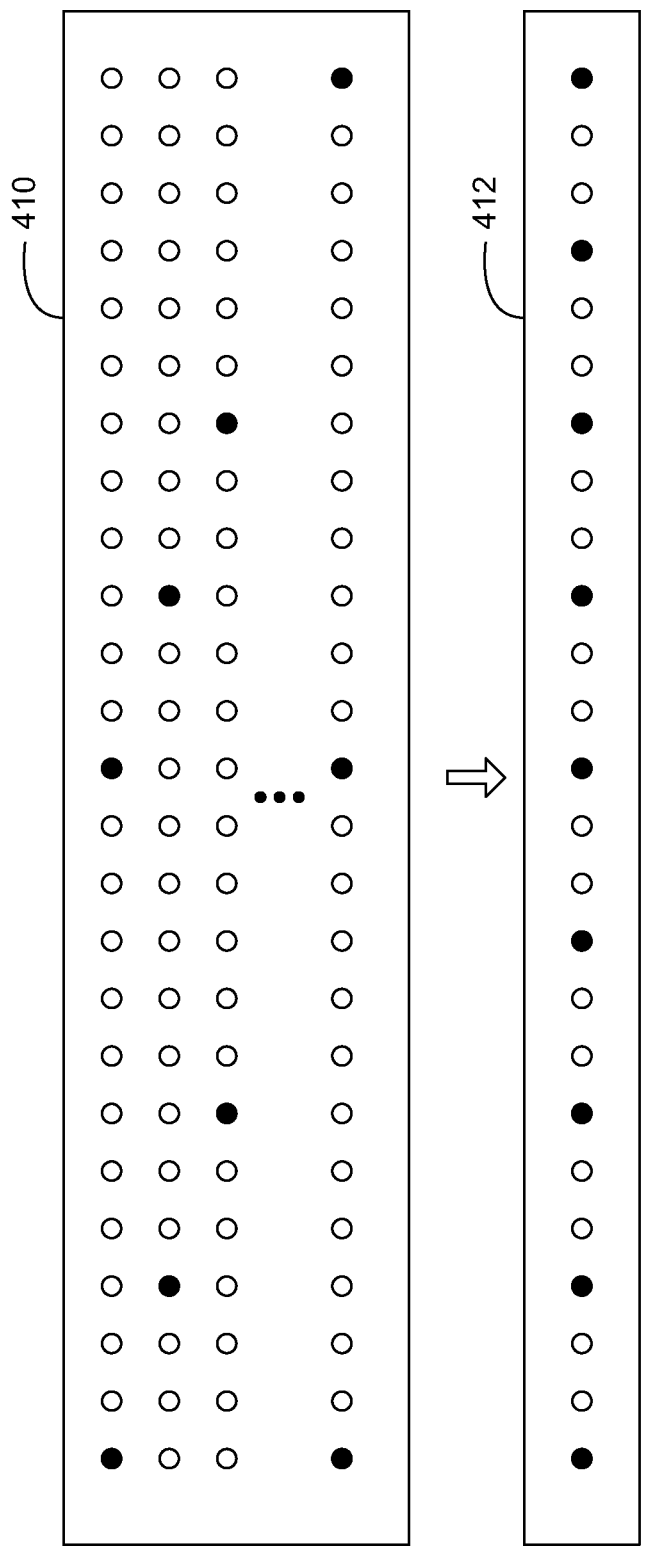
FIG. 4 illustrates the results of getting a weighted summation of previous symbols for use in getting a scattered pilot snapshot.

FIG. 4 illustrates the results of getting a weighted summation of previous symbols for use in generating a scattered pilot snapshot. Referring to FIG. 4, the received OFDM symbols 410 represent the symbols received in parallel over various OFDM subcarriers, where the x-axis represents the frequency domain, the subcarriers, and the y-axis represents the time domain. Weighted summation symbols 412 represent the weighted summation of the previously received OFDM symbols 410. In this example, the weighted summation symbols 412 have weighted pilot symbols every three subcarriers. This weighted pilot information may not be very accurate since it is the summation of previously received pilot symbols and previously received data carrier symbols. However, the weighted pilot information may still be useful in finding multipath location information. Note, the positions of the weighted pilot symbols are dependent on the scatter pilot distribution. It is intended that this invention is not limited to the pilot distribution illustrated in FIG. 4, but may equally work for all types of scattered pilot distributions.

After a scattered pilot snapshot is determined, the inverse fast Fourier transform ("IFFT") of the snapshot is calculated to get the channel impulse response ("CIR"). The CIR may not be entirely accurate since the CIR is based on the group symbol information of the snapshot and not the actual current pilot information. However, some path information, such as the path location, determined by the CIR can be used for channel estimation. In particular, the output of the CIR can be adapted to return the path index/location information, e.g. in Equation (3). The magnitude of the CIR may not be accurate, for reasons discussed above; therefore, that information can be discarded.

For instance, when an IFFT is performed on a scattered pilot snapshot to get the CIR, this CIR may not be accurate, but its path location has valid multipath information. Using this location information, the CIR can be adapted with the aid of the known scattered pilot as a training signal. The formula used here is:

$$h_n(k) = h_n(k-1) + \mu \nabla \epsilon(k) X(k) \quad (1)$$

where $h_n(k)$ is the complex CIR at path location n for pilot k, n is the subcarrier location from 0 to 6816 for the 8k mode or from 0 to 1704 for the 2k mode, $$\nabla \epsilon(k) \quad (2)$$

Equation (2) is the gradient of the error signal, X(k) is the input related to pilot index k, and $\mu$ is the step-size. The error signal is $$\varepsilon(k) = Y(k) - \sum_n h_n e^{-j2\pi/Nnk} \quad (3)$$

where Y(k) is the received signal at the known scattered pilot, n is the location with non-zero impulse response, and N is the OFDM size, i.e. N=8192 for 8k mode and N=2048 for 2k mode. Therefore, using an adaptive algorithm, such as Equation (1), H can be adapted and the channel impulse response found for the n location.

In an OFDM system, such as the DVB-T system, a signal is transmitted continuously, wherein the signal comprises of conceptual OFDM symbol boundaries. The locations of the start points and end points of each OFDM symbol (otherwise known as a FFT window) are important for channel estimation.

Figure 1:
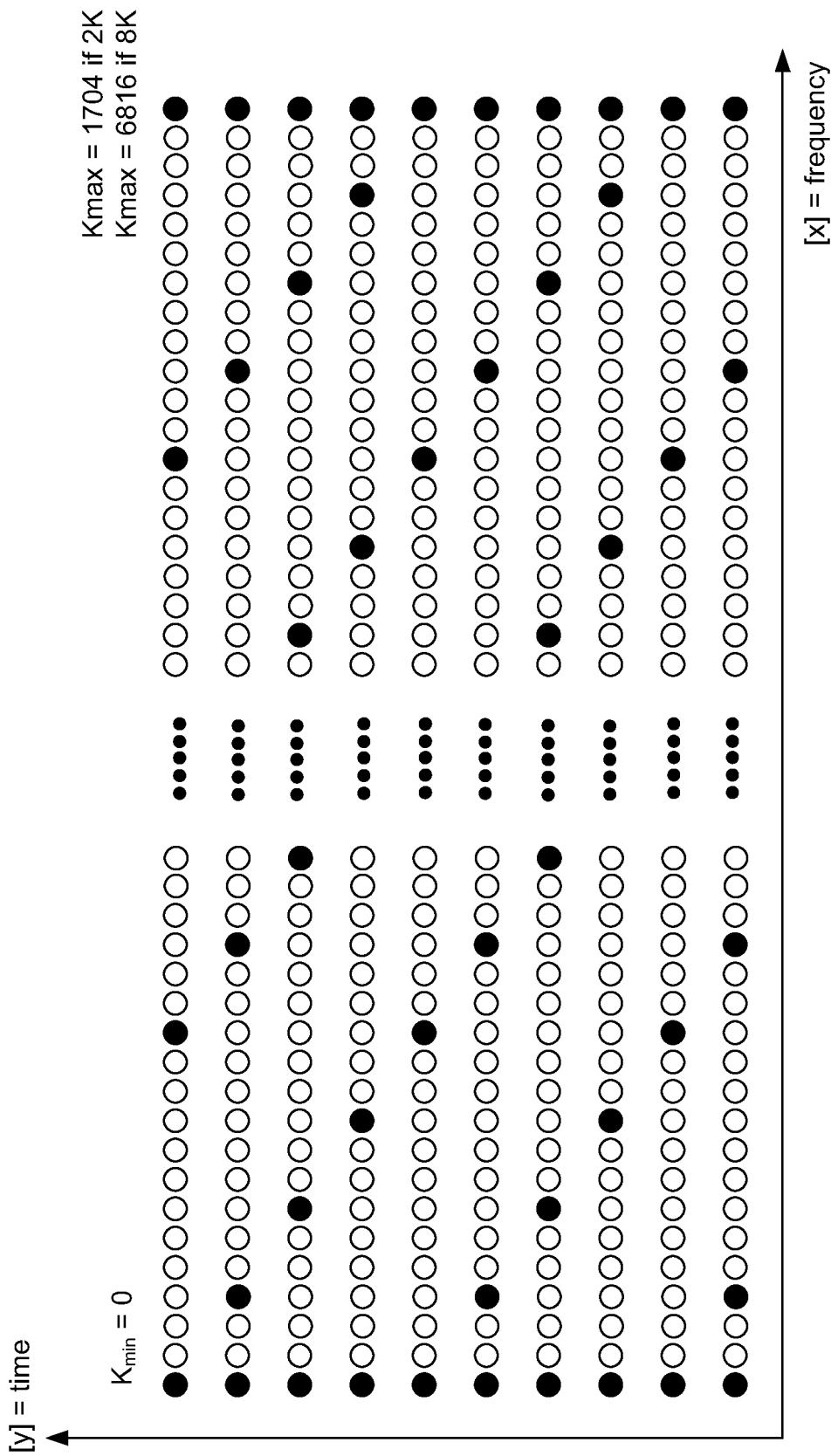
FIG. 1 illustrates a pilot distribution pattern in the frequency domain versus time domain for the DVB-T standard, where the shaded circles are pilot symbols and the empty circles are the data symbols.
Figure 2:
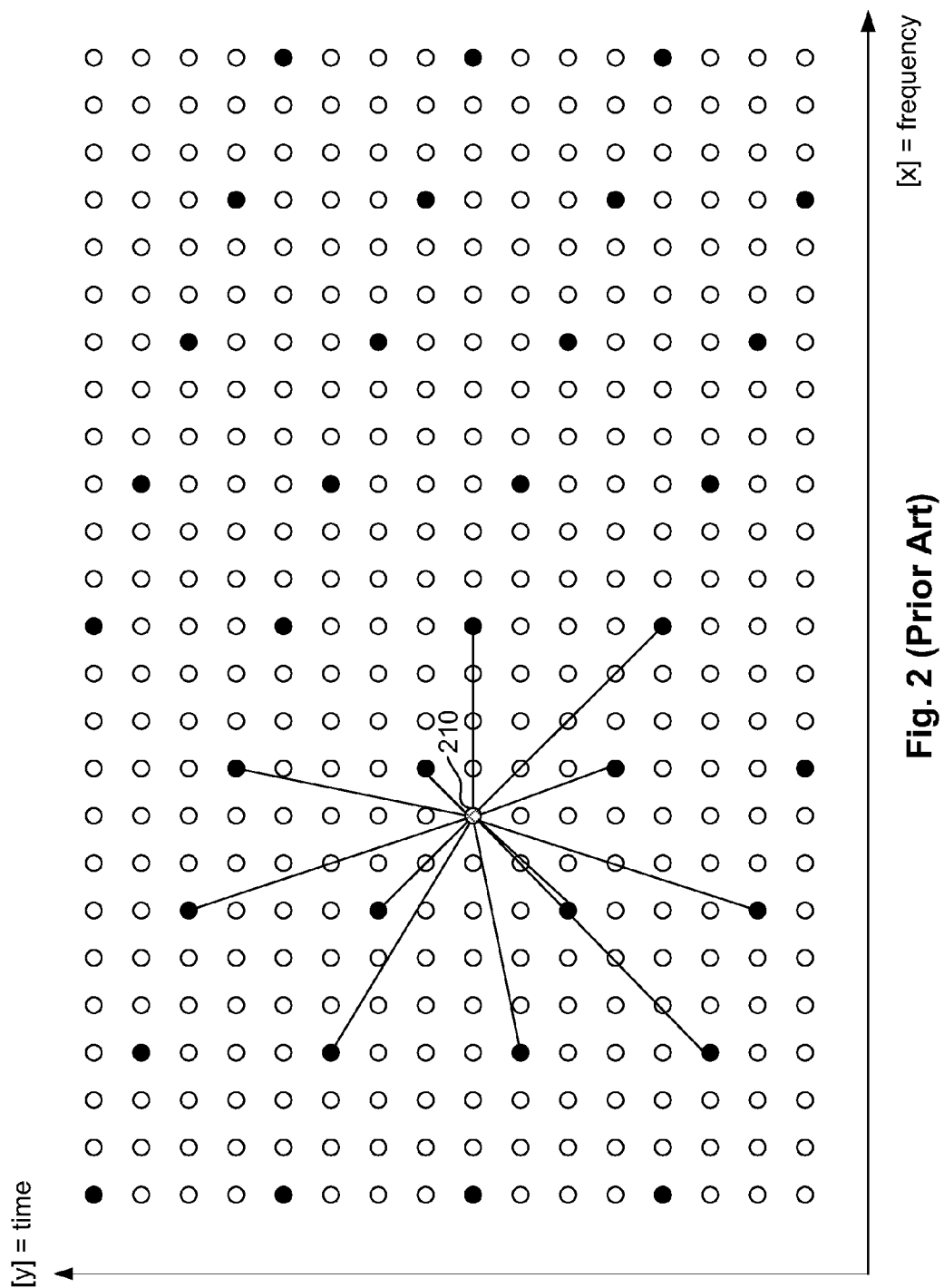
FIG. 2 illustrates a prior art method of using 12 pilot symbols to interpolate a current data carrier symbol for channel estimation.

The start of a FFT window is generally the first path location. Additionally, in DVB-T systems, the scatter pilot location is distributed in the following manner: at carriers 0, 12, 24, and so forth in symbol 0; at carriers 3, 15, 27, and so forth in symbol 1; at carriers 6, 18, 30, and so forth in symbol 2; at carriers 9, 21, 33, and so forth in symbol 3; and so on (see FIG. 1). By combining the neighboring 4 symbols, a scatter pilot snap shot can be obtained with one pilot in every 3 carriers. By performing an IFFT on this pilot snap shot, the path profile in the time domain can be obtained. The path window length can be N/3, where N is the OFDM symbol length. This path profile can give information, such as where an OFDM symbol actually starts relative to an OFDM window assumption, how many multi-paths exist, and the symbol's relative delay profile.

Figure 5:
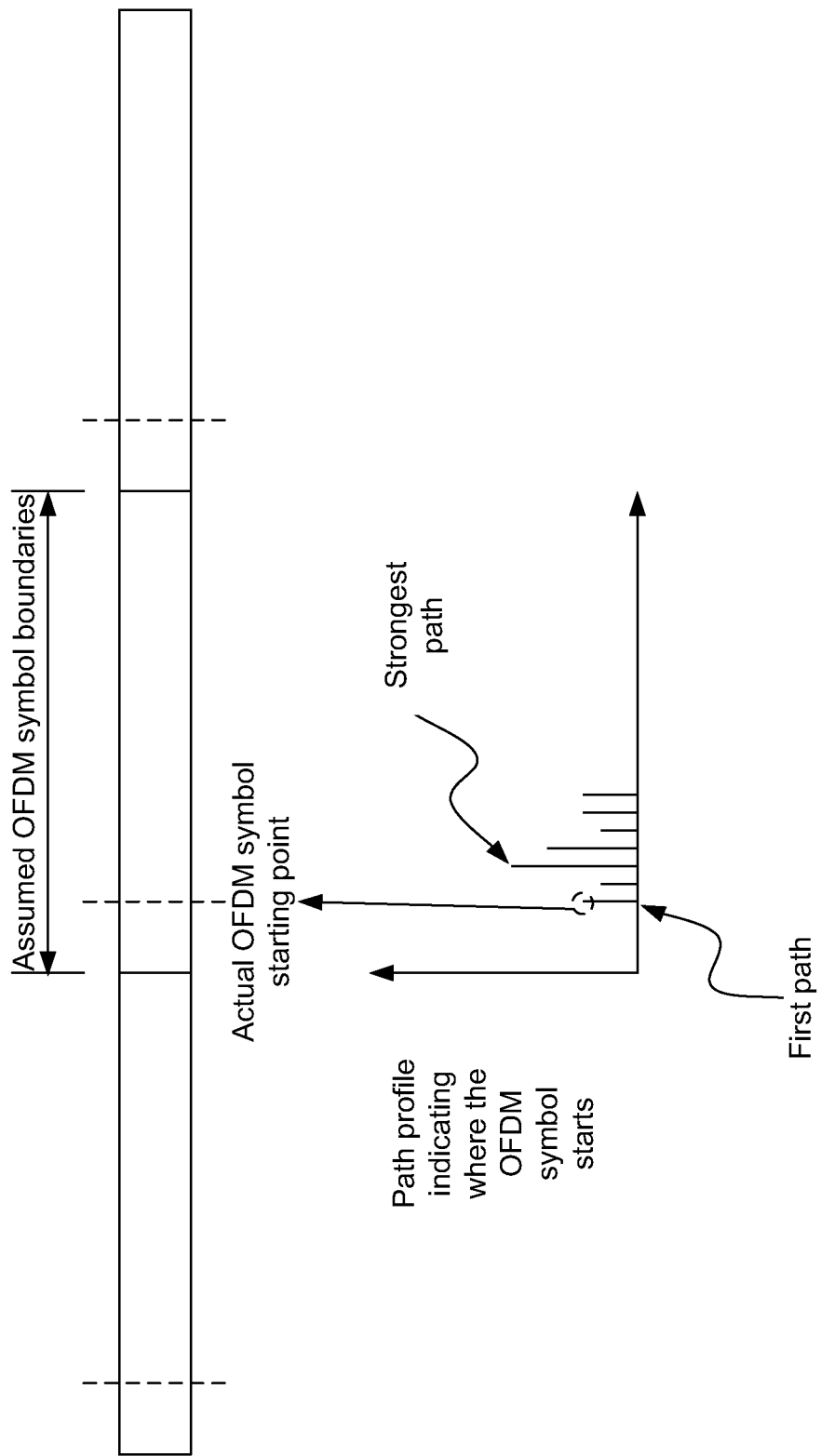
FIG. 5 illustrates a normal case for the boundaries of an OFDM symbol.

FIG. 5 illustrates a normal case for the boundaries of an OFDM symbol. For this case, an OFDM's actual starting point correlates to the first path in a multipath profile.

Figure 6:
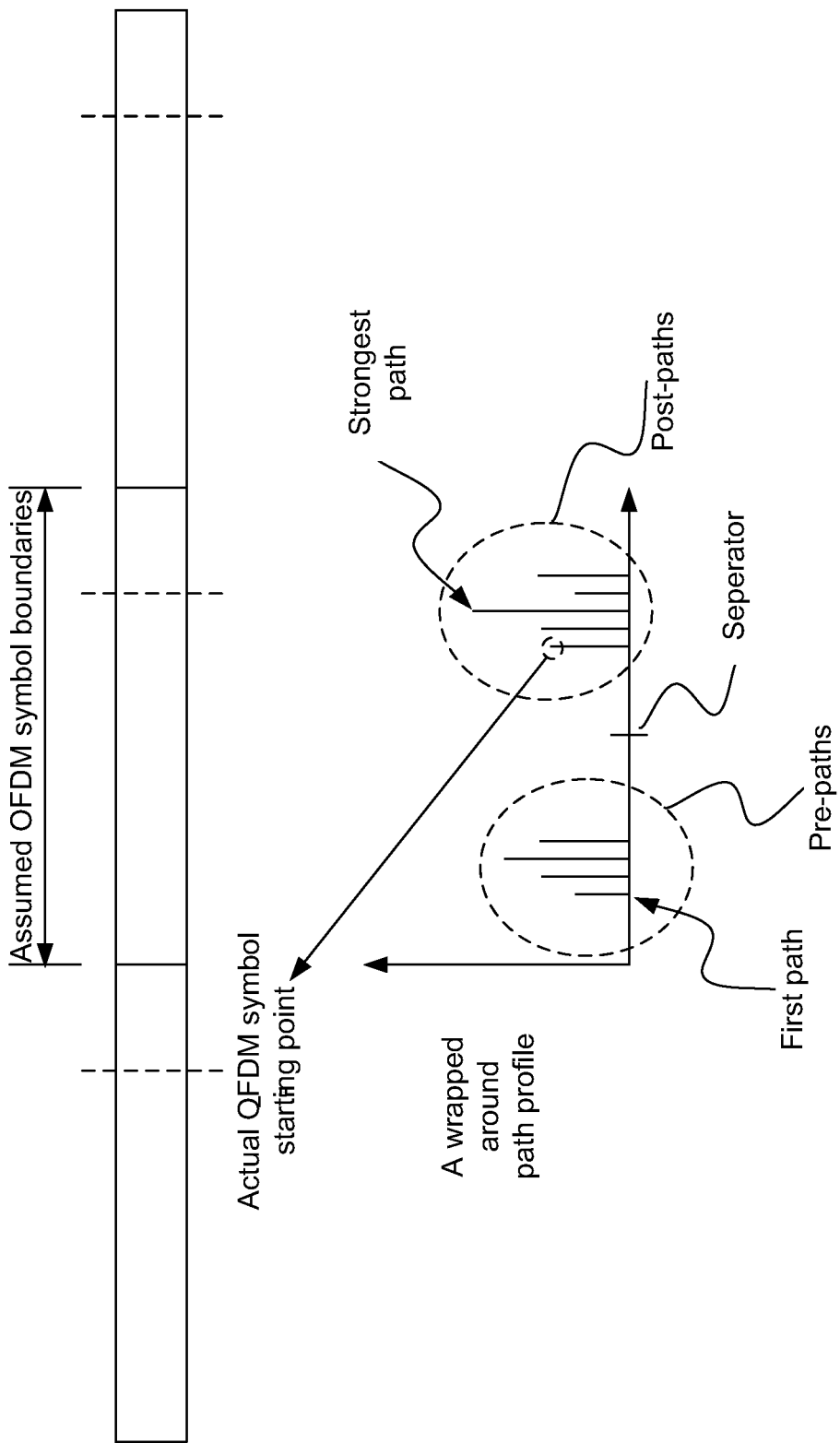
FIG. 6 illustrates a wrapped around path profile for a symbol.

FIG. 6 illustrates a wrapped around path profile for a symbol. To accommodate for the path profile shown in FIG. 6, two different path groups, one referred to as pre-paths and the other referred to as post-paths, are indicated. The wrapped around path is the pre-path shown in FIG. 6. Mistaking pre-paths for post-paths can interfere with channel estimation since the start and end points of an OFDM symbol cannot be accurately ascertained.

In a preferred embodiment of the present invention, a range of locations can be preset to account for pre-paths. In a normal case, a pre-path window can be from a range of [−N/12, 0], and a post-path window can be from a range of [0, N/4], where the 0th position corresponds to a current OFDM window, i.e. the current symbol starting position. This starting position can be denoted by a separator arrow, illustrated in FIG. 6. If the distance between a first path and a strongest path is smaller than N/12, the path profile is correct. If the distance between a first path and a strongest path is greater than N/12, the first path is not the starting point of the OFDM symbol. The real first path is among the post-paths.

The wrapped around path profile can be distinguished from the normal case by obtaining the difference between a scatter pilot carrier's signal-to-noise-ratio (SNR) and a TPS carrier's SNR. The TPS carrier contains information buried in the data carriers. Since this particular information is decoded before channel estimation, it can be treated as known carriers. When the path profile is correct, the pilot carrier's SNR and the data carrier's SNR (or TPS carrier's SNR) can be very close; and when the path profile is not correct, the pilot carrier's SNR can be very high, while the data carrier's SNR (or TPS carrier's SNR) can be very small. This difference can be used to adjust the OFDM window to get an optimal OFDM window.

With the channel impulse response in the time domain, the channel response in the frequency domain can be found by applying a fast Fourier transform (FFT). With the channel response, the receiver side can be adjusted for optimal reception for decoding the received OFDM data signals.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

We claim:

1. A method for decoding received symbols by a digital communications system, comprising the steps of:
    generating a scattered pilot snapshot based on received symbols;
    calculating a channel impulse response ("CIR") using the scattered pilot snapshot;
    calculating a channel frequency response based on the channel impulse response; and
    decoding a received symbol based on the channel frequency response by the digital communications system,
    wherein a starting position and an ending position for each of the received symbols are determined based on a first path and a strongest path of said CIR,
    wherein a pre-path window with a first predefined range and a post-path window with a second predefined range are generated, and
    wherein if a distance between the first path and the strongest path is greater than the absolute distance of said first predefined range, then the starting position is adjusted to a path in said post-path window.

2. The method in claim 1 wherein the scattered pilot snapshot is calculated by applying a weighted summation function on two or more of the received symbols.

3. The method of claim 2 wherein said weighted summation function comprises of a set of low-pass filter coefficients.

4. The method of claim 1 wherein, in calculating the CIR step, inverse fast Fourier transform of the snapshot is performed in calculating the CIR.

5. The method of claim 1 wherein path locations determined from the calculated CIR is used as a training signal.

6. The method of claim 1 wherein the CIR is adapted from the scatter pilot snapshot as a training signal, where $$h_n(k) = h_n(k-1) + \mu \nabla \epsilon(k) X(k)$$

where $h_n(k)$ is the complex CIR at path location n for pilot k, n is the subcarrier location, $\nabla \epsilon(k)$ is the gradient of an error signal, $X(k)$ is an input related to pilot index k, $\mu$ is the step-size, and the error signal is $$\varepsilon(k) = Y(k) - \sum_n h_n e^{-j2\pi/Nnk},$$

where $Y(k)$ is the received symbol at the scattered pilot, n is the location with non-zero impulse response, and N is the OFDM size.

7. The method of claim 1 wherein the scatter pilot snapshot is obtained with one pilot in every 3 carriers.

8. A method for decoding received symbols by a digital communications system, comprising the steps of:
    generating a scattered pilot snapshot based on received symbols, wherein the scattered pilot snapshot is calculated by applying a weighted summation function on two or more of the received symbols;
    calculating a channel impulse response ("CIR") using the scattered pilot snapshot, wherein path locations determined from the calculated CIR is used as a training signal;
    calculating a channel frequency response based on the channel impulse response; and
    decoding a received symbol based on the channel frequency response by the digital communications system;
    wherein a starting position and an ending position for each of the received symbols are determined based on a first path and a strongest path of said CIR,
    wherein a pre-path window with a first predefined range and a post-path window with a second predefined range are generated, and
    wherein if a distance between the first path and the strongest path is greater than the absolute distance of said first predefined range, then the starting position is adjusted to a path in said post-path window.

9. The method of claim 8 wherein said weighted summation function comprises of a set of low-pass filter coefficients.

10. The method of claim 8 wherein, in calculating the CIR step, inverse fast Fourier transform of the snapshot is performed in calculating the CIR.

11. The method of claim 8 wherein the CIR is adapted from the scatter pilot snapshot as a training signal, where $$h_n(k)=h_n(k-1)+\mu\nabla\epsilon(k)X(k)$$

where $h_n(k)$ is the complex CIR at path location n for pilot k, n is the subcarrier location, $\nabla\epsilon(k)$ is the gradient of an error signal, $X(k)$ is an input related to pilot index k, $\mu$ is the step-size, and the error signal is $$\epsilon(k) = Y(k) - \sum_n h_n e^{-j2\pi/Nnk},$$

where $Y(k)$ is the received symbol at the scattered pilot, n is the location with non-zero impulse response, and N is the OFDM size.

12. The method of claim 8 wherein the scatter pilot snapshot is obtained with one pilot in every 3 carriers.

13. A method for decoding received symbols by a digital communications system, comprising the steps of:
generating a scattered pilot snapshot based on received symbols, wherein the scattered pilot snapshot is calculated by applying a weighted summation function on two or more of the received symbols, wherein the weighted summation comprises of a set of low-pass filter coefficients;
calculating a channel impulse response ("CIR") using the scattered pilot snapshot, wherein path locations determined from the calculated CIR is used as a training signal, and wherein in calculating the CIR inverse fast Fourier transform of the snapshot is performed;
calculating a channel frequency response based on the channel impulse response; and
decoding a received symbol based on the channel frequency response by the digital communications system;
wherein a starting position and an ending position for each of the received symbols are determined based on a first path and a strongest path of said CIR,
wherein a pre-path window with a first predefined range and a post-path window with a second predefined range are generated, and
wherein if a distance between the first path and the strongest path is greater than the absolute distance of said first predefined range, then the starting position is adjusted to a path in said post-path window.

14. The method of claim 13 wherein the CIR is adapted from the scatter pilot snapshot as a training signal, where $$h_n(k)=h_n(k-1)+\mu\nabla\epsilon(k)X(k)$$

where $h_n(k)$ is the complex CIR at path location n for pilot k, n is the subcarrier location, $\nabla\epsilon(k)$ is the gradient of an error signal, $X(k)$ is an input related to pilot index k, $\mu$ is the step-size, and the error signal is $$\epsilon(k) = Y(k) - \sum_n h_n e^{-j2\pi/Nnk},$$

where $Y(k)$ is the received symbol at the scattered pilot, n is the location with non-zero impulse response, and N is the OFDM size.

15. The method of claim 13 wherein the scatter pilot snapshot is obtained with one pilot in every 3 carriers.

* * * * *